(12) United States Patent
Inoue et al.

(10) Patent No.: US 6,195,711 B1
(45) Date of Patent: Feb. 27, 2001

(54) COMMAND WITHIN ASYNCHRONOUS PACKET FOR CONTROLLING

(75) Inventors: Hiraku Inoue, Kanagawa; Makoto Sato; Harumi Kawamura, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/103,837

(22) Filed: Jun. 24, 1998

(30) Foreign Application Priority Data

Jun. 27, 1997 (JP) ................................................ 9-171480

(51) Int. Cl.[7] ...................................................... G06F 13/10
(52) U.S. Cl. .................................................. 710/5; 369/34
(58) Field of Search ............................. 369/30, 34; 709/232; 710/5

(56) References Cited

U.S. PATENT DOCUMENTS

| | | | |
|---|---|---|---|
| 4,932,026 | * | 6/1990 | Dev et al. ............................ 370/400 |
| 5,428,587 | * | 6/1995 | Wanger et al. ........................ 369/30 |
| 5,642,337 | * | 6/1997 | Oskay et al. .......................... 369/30 |
| 5,903,733 | * | 5/1999 | Hong .................................. 709/232 |

* cited by examiner

Primary Examiner—Thomas C. Lee
Assistant Examiner—Albert Wang
(74) Attorney, Agent, or Firm—Jay H. Maioli

(57) ABSTRACT

A communication controlling method and apparatus, a communication controlling system, and a transmission medium exchanges a plurality of media by using a simple command. In controlling exchanging of a plurality of media, a medium exchanging sub unit and a medium driving sub unit are defined, and in the OPC of a command which instructs the medium exchanging sub unit for movement of a medium, a code of a command for instruction for loading or unloading of a predetermined medium is placed: in the OPR1 a slot number of the medium exchanging sub unit (changer) in which the predetermined medium is accommodated is placed; and in the OPR2 a number of a port through which a medium is to be loaded into or unloaded from the medium driving sub unit by the medium exchanging sub unit is placed.

9 Claims, 11 Drawing Sheets

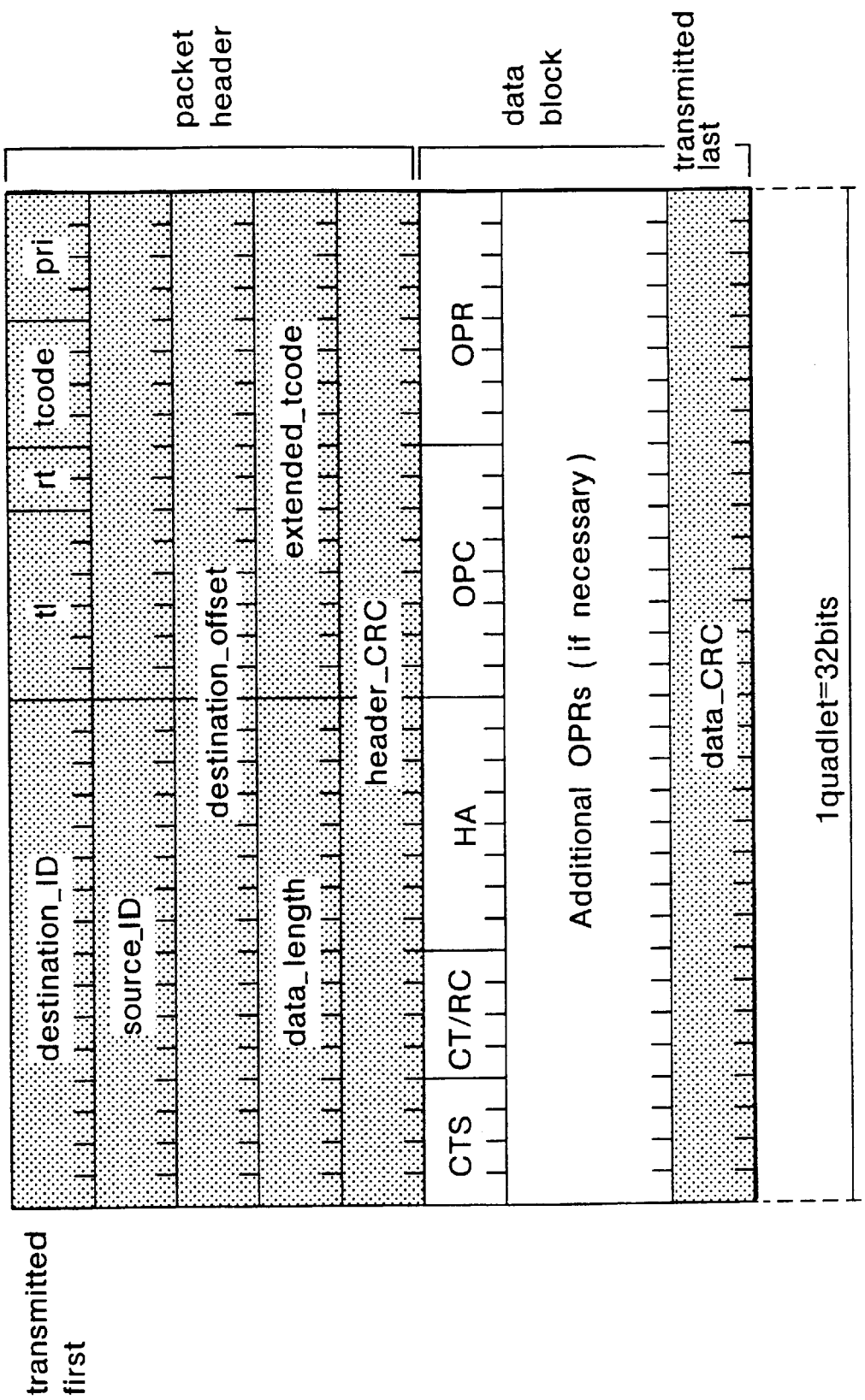

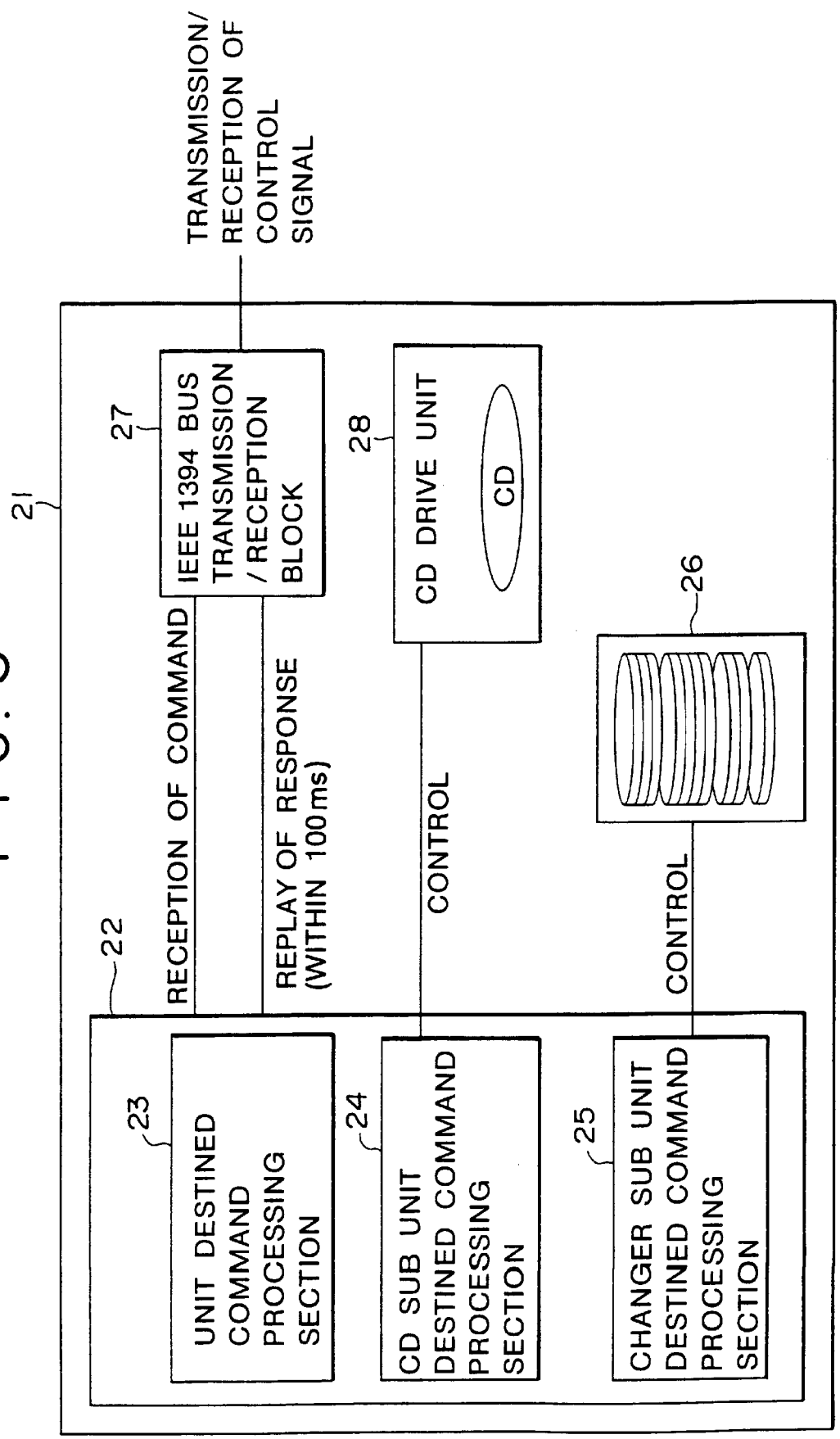

FIG. 4A

| | CTS | CT/RC | HA | OPC | OPR | OPR | OPR |
|---|---|---|---|---|---|---|---|
| COMMAND FORMAT | "0" h | REQUEST TYPE | IN-APPARATUS DESTINATION | COMMAND | PARAMETER 1 | PARAMETER 2 | PARAMETER 3 |
| RESPONSE FORMAT | "0" h | ANSWER TYPE | IN-APPARATUS SENDING SOURCE | PROCESSED COMMAND | PARAMETER 1 | PARAMETER 2 | PARAMETER 3 |

FIG. 4B

| | | | | |
|---|---|---|---|---|
| CONTROL COMMAND TO CD SUB UNIT | "0" h | Control | CD SUB UNIT | Do 'PLAY' | 'Normal' |
| RESPONSE FROM CD SUB UNIT | "0" h | ACCEPT | CD SUB UNIT | Do 'PLAY' | 'Normal' |

FIG. 4C

| | | | | | | |
|---|---|---|---|---|---|---|
| INQUIRY COMMAND TO UNIT | "0" h | Status Inquiry | UNIT | Unit Info | ? | ? | ? |
| RESPONSE FROM UNIT | "0" h | STABLE | UNIT | Unit Info | CD UNIT | CD SUB UNIT × 1 | CHANGER SUB UNIT × 1 |

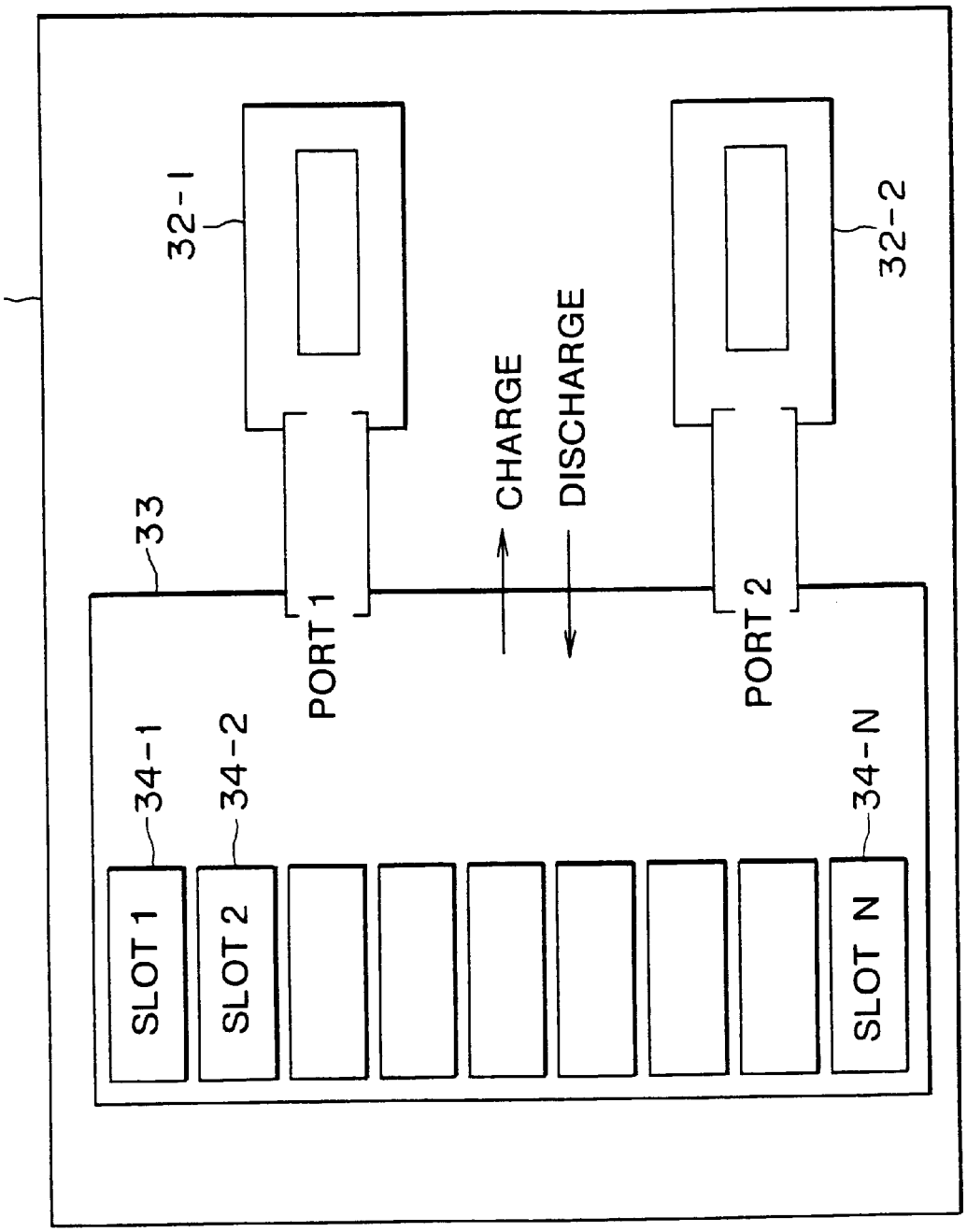

FIG. 9

| | 1 byte |
|---|---|
| byte 1 | PORT NUMBER OF CHANGER SUB UNIT (FOR EXAMPLE : 2 PORTS) |
| byte 2 | LINKAGE OF PORT 1 (EXAMPLE : EXTERNAL UNIT 1) |
| byte 3 --- byte 10 | Node_Unique_Id (8 BYTE) OF EXTERNAL UNIT 1 |
| byte 11 | LINKAGE OF PORT 2 (EXAMPLE : EXTERNAL UNIT 2) |
| byte 12 --- byte 19 | Node_Unique_Id (8 BYTE) OF EXTERNAL UNIT 2 |

FIG. 10

CDB FORM:

| BYTE \ BIT | 7 | 6 | 5 | 4 | 3 | 2 | 1 | 0 |
|---|---|---|---|---|---|---|---|---|
| 0 | A5h (OPERATION CODE) | | | | | | | |
| 1 | LUN | | | Reserved | | | | |
| 2 | (MSB) ──CARRIER ELEMENT ADDRESS── | | | | | | | |
| 3 | | | | | | | | (LSB) |
| 4 | (MSB) ──SOURCE ADDRESS── | | | | | | | |
| 5 | | | | | | | | (LSB) |
| 6 | (MSB) ──DESTINATION ADDRESS── | | | | | | | |
| 7 | | | | | | | | (LSB) |
| 8 | Reserved | | | | | | | |
| 9 | Reserved | | | | | | | |
| 10 | Reserved | | | | | | | Invert |
| 11 | CONTROL BYTE | | | | | | | |

F I G. 11

CDB FORM :

| BYTE \ BIT | 7 | 6 | 5 | 4 | 3 | 2 | 1 | 0 |
|---|---|---|---|---|---|---|---|---|
| 0 | 28h (OPERATION CODE) ||||||||
| 1 | LUN ||| Reserved |||||
| 2 | (MSB) — CARRIER ELEMENT ADDRESS — ||||||||
| 3 | — (LSB) ||||||||
| 4 | (MSB) — DESTINATION ELEMENT ADDRESS — ||||||||
| 5 | — (LSB) ||||||||
| 6 | Reserved ||||||||
| 7 | Reserved ||||||||
| 8 | Reserved ||||||| Invert |
| 9 | CONTROL BYTE ||||||||

FIG. 12

CDB FORM :

| BYTE \ BIT | 7 | 6 | 5 | 4 | 3 | 2 | 1 | 0 |
|---|---|---|---|---|---|---|---|---|
| 0 | A6h (OPERATION CODE) | | | | | | | |
| 1 | LUN | | | Reserved | | | | |
| 2 | (MSB) | | | | | | | |
| 3 | ———CARRIER ELEMENT ADDRESS——— (LSB) | | | | | | | |
| 4 | (MSB) | | | | | | | |
| 5 | ———SOURCE ADDRESS——— (LSB) | | | | | | | |
| 6 | (MSB) | | | | | | | |
| 7 | ———FIRST DESTINATION ADDRESS——— (LSB) | | | | | | | |
| 8 | (MSB) | | | | | | | |
| 9 | ———SECOND DESTINATION ADDRESS——— (LSB) | | | | | | | |
| 10 | Reserved | | | | | | Inv2 | Inv1 |
| 11 | CONTROL BYTE | | | | | | | |

COMMAND WITHIN ASYNCHRONOUS PACKET FOR CONTROLLING

BACKGROUND OF THE INVENTION

1. Field of the Invention

This invention relates to a communication controlling method and apparatus, a communication controlling system and a transmission medium, and more particularly to a communication controlling method and apparatus, a communication controlling system and a transmission medium by which control of a plurality of apparatus connected to each other, for example, by a bus which can transmit a control signal in the form of a packet can be performed by a simple command.

2. Description of the Related Art

In recent years, a medium changing device has been developed and a medium exchanging function to a primary device such as a CD player has been defined in the SCSI-2 (small computer system interface 2) standard. The medium changing device is functionally divided into four elements including a medium transfer element, a storage element, a loading/unloading element and a data transfer element. Accordingly, also where a medium exchanging function of a small scale has been implemented, each element is defined by an address of 16-bit length as seen in FIGS. 10 to 12.

Further, movement of a medium can be performed using an instruction which includes a combination of two commands of the Position to Element command illustrated in FIG. 11 and the Move Medium command illustrated in FIG. 10. The Position to Element command is a command to position a designated transport element to the front of a destination element (a position at which the Move Medium command can be executed (to unload a medium from a source element) without any further movement). To the transfer element address, the address of a medium transfer element to be moved by the Position to Element command is designated. To the destination element address, one of the storage element, loading/unloading element, data transfer element and medium transport element is designated.

The Move Medium command is a command for moving a medium which is present in a source element to a destination element. To the transport element address, the address of a medium transport element to be used when the Move Medium command is executed is designated. To the source address or the destination address, one of the storage element, loading/unloading element, data transfer element and medium transport element is designated.

Meanwhile, the Exchange Medium command illustrated in FIG. 12 is a command for exchanging (moving) media between designated elements. A medium present in a source element is transferred to a first destination element, and another medium present in the first destination element is transferred to a second destination element. The same element can be designated as the source element and the second destination element. In this instance, exchanging of media is performed between the source element and the first destination element.

To the transfer element address, the address of a medium transfer element (for example, an arm) to be used when the Exchange Medium command is executed is designated. To each of the source address, first destination address and second destination address, one of the storage element, loading/unloading element, data transfer element and medium transport element is designated.

To the Inv1 (Invert-1), it is designated whether or not a medium (double-sided medium) should be turned upside down when it is moved to the first destination element. To the Inv2 (Invert-2), it is designated whether or not a medium (double-sided medium) should be turned upside down when it is moved to the second destination element.

Here, the data transfer element is a logical definition of a primary device which actually handles a medium to input or output data.

Also where a medium exchanging function is implemented in a small scale in this manner, it is required to define each element with an address of 8-bit length, and the command length is as long as approximately 10 bytes as seen from FIGS. 10 to 12. Therefore, there is a problem in that description of a command is complicated.

Further, in order to effect, for example, movement of a medium, a plurality of commands must be combined. Thus, there is another problem in that such combination of commands is cumbersome.

SUMMARY OF THE INVENTION

It is an object of the present invention to provide a communication controlling method and apparatus, a communication controlling system, and a transmission medium by which exchanging of a plurality of media can be performed using a simple command.

In order to attain the object described above, according to an aspect of the present invention, there is provided a communication controlling method for controlling exchange of a medium between a plurality of apparatus connected to each other by a bus by which a control signal can be transmitted with a packet, comprising the step of receiving, when exchanging of a plurality of media is to be controlled, over the bus a packet which includes a command for performing control of a first sub unit which effects a medium changing operation and a second sub unit which effects a medium driving operation separately from each other.

According to another aspect of the present invention, there is provided a communication controlling apparatus for controlling exchange of a medium between a plurality of apparatus connected to each other by a bus through which a control signal is transmitted with a packet, comprising reception means for receiving a packet which includes a command for performing control of a first sub unit which effects a medium changing operation and a second sub unit which effects a medium driving operation separately from each other, and supply means for selectively supplying the command included in the packet received by the reception means to one of the first sub unit and the second sub unit.

With the communication controlling method and the communication controlling apparatus, since a packet which includes a command for performing control of a first sub unit which effects a medium changing operation and a second sub unit which effects a medium driving operation separately from each other is received over the bus, controlling the exchange of a plurality of media can be performed using a simple command.

According to a further aspect of the present invention, there is provided a communication controlling method for controlling exchange of a medium between a plurality of apparatus connected to each other by a bus through which a control signal is transmitted with a packet, comprising the step of transmitting, when exchange of a plurality of media is to be controlled, over the bus a packet which includes a command for performing control of a first sub unit which effects a medium changing operation and a second sub unit which effects a medium driving operation separately from each other.

According to a still further aspect of the present invention, there is provided a communication controlling apparatus for controlling exchange of a medium between a plurality of apparatus connected to each other by a bus through which a control signal is transmitted with a packet, comprising production means for producing a packet which includes a command for performing control of a first sub unit which effects a medium changing operation and a second sub unit which effects a medium driving operation separately from each other, and transmission means for transmitting the packet produced by the production means to a different one of the apparatus over the bus.

With the communication controlling method and the communication controlling apparatus, since a packet which includes a command for performing control of a first sub unit which effects a medium changing operation and a second sub unit which effects a medium driving operation separately from each other is transmitted over the bus, controling the exchange of a plurality of media can be performed using a simple command.

According to a still further aspect of the present invention, there is provided a communication controlling system for controlling exchange of a medium between a plurality of apparatus connected to each other by a bus through which a control signal is transmitted with a packet, comprising production means provided in a first one of the apparatus for producing a packet which includes a command for performing control of a first sub unit which effects a medium changing operation and a second sub unit which effects a medium driving operation separately from each other, transmission means provided in the first apparatus for transmitting the packet produced by the production means to a second one of the apparatus over the bus, reception means provided in the second apparatus for receiving the packet transmitted by the transmission means, and supply means provided in the second apparatus for selectively supplying the command included in the packet received by the reception means to one of the first sub unit and the second sub unit.

With the communication controlling system, since it has the construction described above, controlling the exchange of a plurality of media can be performed using a simple command.

According to a still further aspect of the present invention, there is provided a transmission medium by which a computer program for controlling a communication controlling system for controlling exchange of a medium between a plurality of apparatus connected to each other by a bus through which a control signal is transmitted with a packet is transmitted, the computer program comprising a production step of producing a packet which includes a command for performing control of a first sub unit which effects a medium changing operation and a second sub unit which effects a medium driving operation separately from each other, a transmission step of transmitting the packet produced in the production step to another one of the apparatus over the bus, a reception step of receiving the packet transmitted in the transmission step, and a supply step of selectively supplying the command included in the packet received in the reception step to one of the first sub unit and the second sub unit.

With the transmission medium, since it transmits the computer program having the steps described above, controlling the exchange of a plurality of media can be performed using a simple command.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 2 is a diagrammatic view showing an example of a packet structure of a command and a response;

FIG. 3 is a block diagram showing an example of a construction of a CD player which can respond to a command;

FIGS. 4A, 4B and 4C are diagrammatic views showing examples of a format and a construction of a command/response;

FIG. 5 is a schematic view showing an example of a construction of a form of a CD changer system;

FIG. 9 is a diagrammatic view illustrating another example of an entry of a descriptor of a unit;

FIG. 10 is a diagrammatic view illustrating an example of a Move Medium command;

FIG. 11 is a similar view but illustrating an example of a Position to Element command; and FIG. 12 is a similar view but illustrating an example of an Exchange Medium command.

DESCRIPTION OF THE PREFERRED EMBODIMENT

Figure 1:
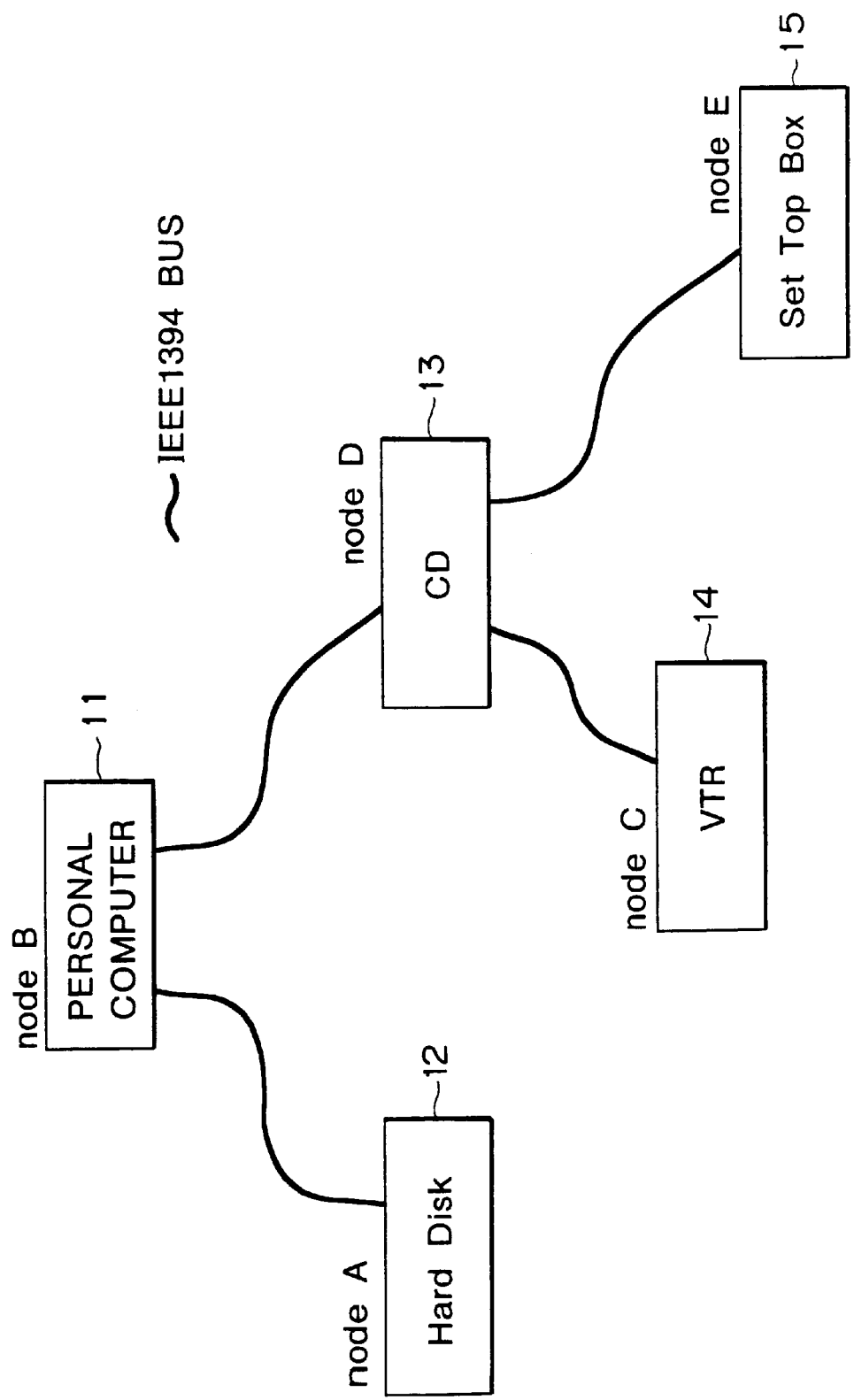
FIG. 1 is a diagrammatic view showing an example of a construction of a system wherein a plurality of units are connected to each other by an IEEE 1394 bus.

Referring first to FIG. 1, there is shown an example of a construction of a system wherein a plurality of units are connected to each other by a bus according to the IEEE (Institute of Electrical and Electronics Engineers) 1394, High Performance Serial Bus standards (hereinafter referred to simply as IEEE 1394 bus). A personal computer 11 is connected to a hard disk drive 12 and a CD (compact disk) player 13 each by an IEEE 1394 bus. The CD player 13 is connected to a video tape recorder (VTR) 14 and a set top box 15 each by an IEEE 1394 bus.

Between the individual apparatus or units in the system, a control signal is communicated by asynchronous communication. A control signal used when each unit requests another unit for something is called a command, and a unit which places the command into a packet and transmits the packet is called a controller. Further, another unit which is to receive the command is called a target.

A target which receives a command transmitted thereto from a controller transmits, when necessary, to the controller a packet which includes a control signal (such control signal is hereinafter referred to as a response) representative of a result of execution of the command.

Such command and response are communicated between one controller and one target. A sequence of communications which begins with transmission of the command and ends with sending back of the response is called a command transaction.

It is determined that the target returns a response as early as possible, for example, within 100 milliseconds after a command is received. This is because it is intended to prevent processing caused by the controller having to wait for a response for a long time or the target suffering from some trouble and failing to send back a response.

The controller can request the target for a particular operation or inquire of the target for a current status by a command transaction. Further, each of the units which compose the system can start and stop a command transaction. In other words, each unit can serve as any of a controller and a target.

FIG. 2 illustrates a structure of a packet for asynchronous communication which is produced by any unit and includes a control signal. For both of packets for a command and a response, a packet of the structure illustrated in FIG. 2 is used.

Referring to FIG. 2, the packet shown is composed of a packet header and a data block. In the packet header, destination_ID for identification of a transfer destination is placed, and next to the destination_ID, tl (Transaction Label) representative of a label of a process, rt (Retry Code) representative of retry playback, tcode (Transaction Code) representative of a code of the process and pri (Priority) representative of a priority order number are successively placed. They are followed by source_ID representative of a transfer source, which in turn is followed by destination_offset representative of lower 48 bits of the address of the transfer destination.

Next to the destination_offset, data_length representative of the data length is placed, and this is followed by extended_tcode representative of some other process code. Finally, header_CRC which is an error detection code in the header is placed.

The data block is composed of CTS (Command Transaction Set) representative of a command language, CT/RC (Ctype/Response Code) which represents, for a command, a type of a request but represents, for a response, a reply to a request, HA (Header Address) representative of whether, for a command, the object of the request is the entire apparatus (unit) or a function block (sub unit) included in the unit, OPR (Operand) representative of a parameter necessary for the command, and, when necessary, Additional OPRs and data_CRC which is an error detection code in the data.

In the asynchronous packet illustrated in FIG. 2, shaded portions, that is, of the destination_ID to the header_CRC are prescribed in the IEEE 1394 standards, and a portion which is not indicated dark, that is, the data field (the CTS to the Additional OPRs), is written in addresses indicated by the destination_offset from a node indicated by the source_ID to another node indicated by the destination_ID.

For example, when a command is to be transmitted from the personal computer 11 to the CD player 13 in the system shown in FIG. 1, the node B is designated in the source_ID while the node D is designated in the destination_ID, and an address for receiving a command is designated in the destination_offset.

FIG. 3 shows an example of a construction of a CD player having a command responding function. A microprocessor 22 (supply means, production means, storage means) which composes the CD player 21 controls components of the CD player 21 as hereinafter described and includes a unit destined command processing section 23 for processing a command destined for the unit (in the example shown, the CD player 21), a CD sub unit destined command processing section 24 for processing a command destined for a CD sub unit (in the example shown, a CD drive unit 28), and a changer sub unit destined command processing section 25 for processing a changer sub unit (in the example shown, a changer 26).

The changer 26 stores a plurality of CDs and loads or unloads a predetermined CD into or from the CD drive unit 28, which will be hereinafter described, in accordance with an instruction from the changer sub unit destined command processing section 25 which composes the microprocessor 22. The CD drive unit 28 drives to rotate a CD loaded thereto by the changer 26 in accordance with an instruction from the CD sub unit destined command processing section 24 which composes the microprocessor 22 to play back the CD. An IEEE 1394 bus transmission/reception block 27 (reception means, transmission means) receives a command transmitted thereto from an external apparatus over an IEEE 1394 bus and supplies the command to the microprocessor 22, and transmits a response supplied thereto from the microprocessor 22 to the external apparatus over the IEEE 1394 bus.

Operation of the system is described below. The following description proceeds under the assumption that the CD player 13 shown in FIG. 1 is replaced by the CD player 21 shown in FIG. 3 and the personal computer 11 serves as the external apparatus mentioned above.

For example, if a packet including a command which instructs for playback of a predetermined CD is transmitted to the CD player 21 from the external apparatus (personal computer 11) connected to the CD player 21 by the IEEE 1394 bus, then the packet is received by the IEEE 1394 bus transmission/reception block 27 of the CD player 21, and the command included in the packet is supplied to the microprocessor 22. Then, within 100 milliseconds after the command is supplied to the microprocessor 22, a response to the command is sent back to the IEEE 1394 bus transmission/reception block 27 from the microprocessor 22.

FIGS. 4A to 4C illustrate examples of formats of a command and a response used in command-response communication of the CD player 21 shown in FIG. 3. In particular, as seen in FIG. 4A, when a command is to be transferred, 0 is placed into the CTS, and a code representative of a type of a request is placed into the CT/RC. Further, into the HA, a destination in the unit, for example, an ID or the like of the CD drive unit 28 or the changer 26, is placed. Into the OPC, a code of a command to be transferred is placed, and into the OPR, a parameter is placed.

When a response is to be transferred, as seen in FIG. 4A, 0 is placed into the CTS, and a code representative of a type of the answer is placed into the CT/RC. Into the HA, an ID or the like of a sending source in the unit is placed, and into the OPC, a code of a command processed is placed. Further, a parameter is placed into the OPR.

In this instance, such a packet which includes a command as illustrated in FIG. 4B is transmitted to the CD player 21 from the external apparatus connected by the IEEE 1394 bus. This packet is received by the IEEE 1394 bus transmission/reception block 27 of the CD player 21, and the command included in the packet is supplied to the microprocessor 22. As seen in FIG. 4B, in this command, 0 is placed in the CTS, and Control is placed in the CT/RC. Further, as an in-apparatus destination, an ID or the like of the CD sub unit is placed. The ID of the CD sub unit is set based on a descriptor of the unit which will be hereinafter described with reference to FIG. 7.

In particular, this command is a command to the CD sub unit (CD drive unit 28) and instructs the CD sub unit to effect normal playback (the command is Do 'Play', and the parameter is 'Normal').

Accordingly, the microprocessor 22 supplies this command to the CD sub unit destined command processing section 24. When this command is received, the CD sub unit destined command processing section 24 transmits such a response as illustrated in FIG. 4B to the external apparatus connected to the IEEE 1394 bus through the IEEE 1394 bus transmission/reception block 27. This response is a response from the CD sub unit as seen from FIG. 4B, and the processed command is normal playback (the command is Do 'Play', and the parameter is 'Normal').

In accordance with the command, the CD sub unit destined command processing section 24 instructs the CD drive unit 28 to effect playback of the CD set in the CD drive unit 28. The CD drive unit 28 starts playback of the CD set therein in accordance with the instruction from the CD sub unit destined command processing section 24.

It is possible to cause the CD drive unit 28 to play back a CD in accordance with an instruction from the external apparatus in this manner.

When the external apparatus tries to transmit to the CD player 21 a command to inquire the CD player 21 for its status, such a packet which includes the command as seen in FIG. 4C is transmitted to the CD player 21 over the IEEE 1394 bus. In particular, 0 is placed in the CTS, and Status Inquiry is placed as a type of the command in the CT/RC. Further, the unit is placed as the in-apparatus destination. Furthermore, Unit Info is placed in the OPC, and ? is placed in the OPR.

The packet including the command described above is received by the IEEE 1394 bus transmission/reception block 27, and the command is supplied to the microprocessor 22. Since the request type of the command is Status Inquiry, this command is supplied to the unit destined command processing section 23. The unit destined command processing section 23 supplies such a response to the command as seen in FIG. 4C to the IEEE 1394 bus transmission/reception block 27. In this response, 0 is placed in the CTS, STABLE is placed as a type of the answer in the CT/RC. Further, the unit is placed as the apparatus sending source. Furthermore, Unit Info is placed in the OPC, and the ID of the CD unit (CD player 21), the ID of the CD sub unit (CD drive unit 28) and the changer sub unit (changer 26) are placed in the OPR.

The response supplied to the IEEE 1394 bus transmission/ reception block 27 is transmitted to the external apparatus over the IEEE 1394 bus. Consequently, the external apparatus can acquire status information such as an internal construction of the CD player 21 and so forth.

FIG. 5 is a block diagram showing an example of a construction of a type of a CD changer system to which the communication control apparatus of the present invention is applied. The present CD changer system can be replaced, for example, by the VTR (video tape recorder) 14 shown in FIG. 1.

In the CD changer system shown in FIG. 5, only one function block (sub unit), that is, a medium exchanging sub unit, is provided, and it is not divided into detailed elements. The medium exchanging sub unit defines ports for loading and unloading a medium therethrough and is linked with medium driving sub units which actually handle a medium to input and/or output data.

Consequently, a system wherein medium driving sub units are fixedly positioned to ports of a medium exchanging sub unit can be defined simply. Then, movement of a medium can be requested with a single short command. In this instance, positioning of the medium driving units and the ports of the medium exchanging sub unit is described in descriptors (FIGS. 7 and 9) of the apparatus (units) having those two sub units and can be suitably read out when necessary. Those descriptors may be stored in a memory in the microprocessor 22.

More particularly, the CD (compact disk) changer system 31 is composed of a medium exchanging sub unit (exchanger sub unit 33), a medium driving sub unit (first CD sub unit 32-1 (CD sub unit 1) and second CD sub unit 32-2 (CD sub unit 2)), and ports into and from which a medium is loaded and unloaded. The exchanger sub unit 33 has first to Nth slots 34-1 to 34-N (slot 1 to slot N) so that N CDs can be accommodated therein.

In the exchanger sub unit 33, a first port (port 1) and a second port (port 2) are defined, and the first CD sub unit 32-1 is fixedly positioned to the exchanger sub unit 33 through the first port while the second CD sub unit 32-2 is fixedly positioned to the exchanger sub unit 33 through the second port. Accordingly, as seen in FIG. 6, movement of a medium can be requested with a single short command.

Figure 6:
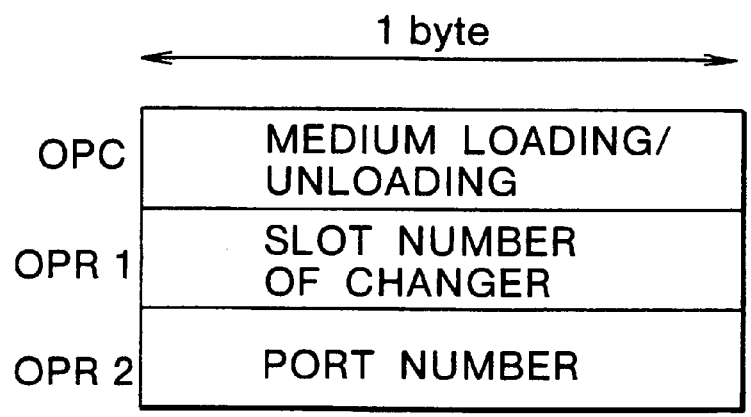
FIG. 6 is a diagrammatic view illustrating an example of a medium moving command.

As seen in FIG. 6, a code of a command representative of loading or unloading of a medium is placed in the OPC, and a slot number of the exchanger sub unit 33 is placed in the OPR1. Further, a port number is placed in the OPR2. Accordingly, where the command is loading of a medium, a CD accommodated in a slot of the number indicated by the OPR1 is loaded into a CD sub unit (in the present example, the first CD sub unit 32-1) positioned to the port of the number indicated by the OPR2. Since the OPRL has a 1-byte (=8 bits) length, it can describe any of the slot numbers of 0 to 255. If it is defined that, when FF (hexadecimal number) is described in the OPR1 the next one byte also represents a slot number, then any of the slot numbers from 256 to 511 can be described by describing one of 0 to 255 in the slot of the latter slot number. Accordingly, slot numbers from 0 to 511 can be described in a region of 2 bytes.

On the other hand, where the command is unloading of a medium, a CD set in a CD sub unit (in this instance, the first CD sub unit 32-1) positioned to the port of the number indicated by the OPR2 is unloaded to the slot of the number indicated by the OPR1.

Figure 7:
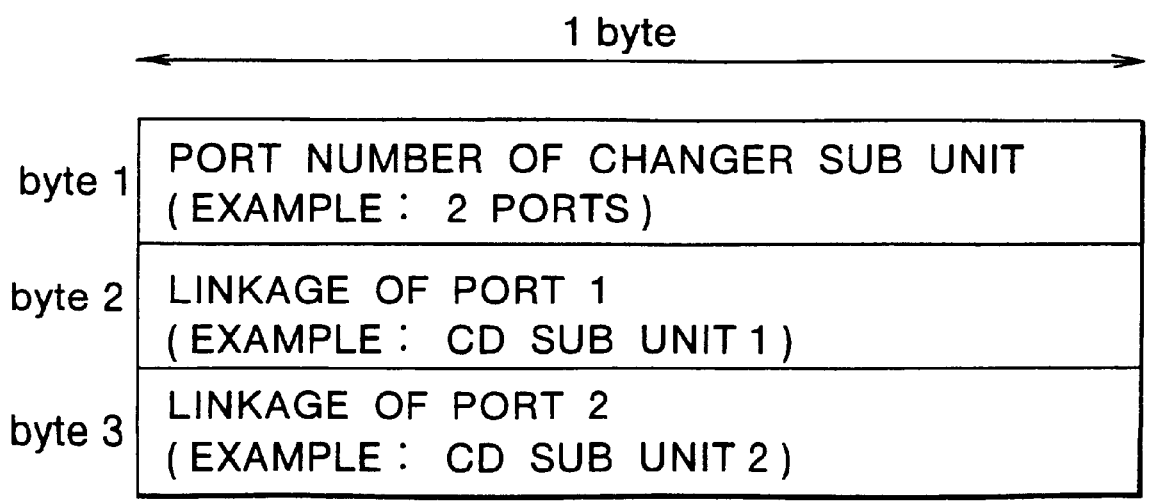
FIG. 7 is a diagrammatic view illustrating an entry of a descriptor of a unit.

Linkage of a port number and a CD sub unit is defined as fixed information in an entry of a descriptor of the unit shown in FIG. 7. In the example shown, the port number (in the example shown, 2) of the exchanger sub unit 33 is placed in the first 1 byte, and linkage information of the first port (an ID of a CD sub unit positioned to the port 1 or the like) is placed in the next 1 byte. Further, linkage information of the second port (an ID of a CD sub unit positioned to the port 2 or the like) is placed in the following 1 byte.

For example, when a packet in which a command which indicates loading of a CD accommodated in the slot 34-2 into the first CD sub unit 32-1 is transmitted from the external apparatus to the CD changer system (unit) 31, a code indicative of "loading of a medium" is described as a type of the command in the OPC of the command, and in the following OPR1, a slot number (in the example shown, 2) corresponding to the second slot 34-2 is described as a slot number of the exchanger sub unit 33. In the further next OPR2, a port number (in the example shown, 1) corresponding to the first port (port 1) to which the first CD sub unit 32-1 is connected is placed as a port number for loading of a CD.

The number of the port to which the first CD sub unit 32-1 is connected can be acquired by referring to the linkage information of the first port and the linkage information of the second port described in the entry of the descriptor of the unit illustrated in FIG. 7.

Accordingly, in the example shown, the exchanger sub unit 33 loads a CD accommodated in the slot 34-2 into the first CD sub unit 32-1 connected to the first port (port 1) designated by the command from the external apparatus.

Further, for example, if a packet in which a command which indicates unloading of a CD accommodated in the first CD sub unit 32-1 to the second slot 34-2 is transmitted from the external apparatus to the CD changer system (unit) 31, a code representative of "unloading of a medium" is described as a type of the command in the OPC of the command, and a slot number (in the example shown, 2) corresponding to the second slot 34-2 is described as a slot number of the exchanger sub unit 33 in the next OPR1. Further, in the next OPR2, a port number (in the present example, 1) corresponding to the first port (port 1) to which the first CD sub unit 32-1 is connected is placed as a port number for unloading of a CD.

Similarly as the case of loading of a medium described hereinabove, the number of the port to which the first CD sub unit 32-1 is connected can be acquired by referring to the linkage information of the first port and the linkage information of the second port described in the entry of the descriptor of the unit illustrated in FIG. 7.

Accordingly, in the case of the present example, the exchanger sub unit 33 unloads a CD from the first CD sub unit 32-1 connected to the first port (port 1) designated by the command from the external apparatus to the slot 34-2 (slot 2).

The particular description is omitted here, loading and unloading of a medium (CD) between any of the other first slot 34-1 and third to Nth slots 34-3 to 34-N and the first CD sub unit 32-1 or the second CD sub unit 32-2 can basically be performed similarly.

A CD accommodated in an arbitrary slot can be loaded into an arbitrary CD sub unit so as to be played back or a CD set in an arbitrary CD sub unit can be unloaded to an arbitrary slot in such a manner as described above.

Figure 8:
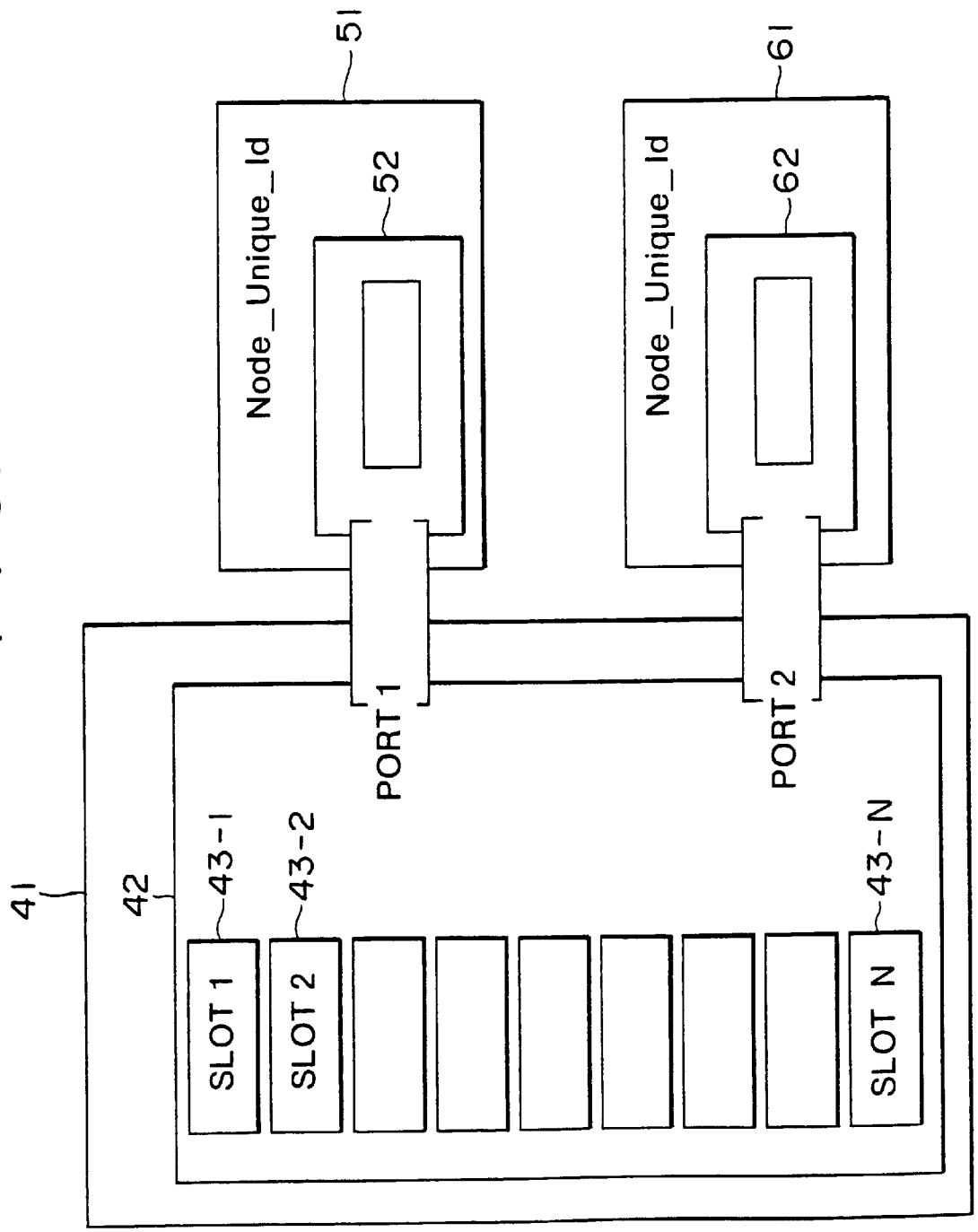
FIG. 8 is a schematic view showing a construction of another form of a CD changer system.

FIG. 8 shows in block diagram an example of a construction of another form of the CD changer system to which the communication controlling apparatus of the present invention is applied. In the present form, a medium driving sub unit (in the present example, a CD sub unit 52 or 62) and a medium exchanging sub unit (in the present example, a changer sub unit 42) are individually mounted in separate units from each other. In particular, the medium driving sub unit 52 is mounted on a unit 51 while the CD sub unit 62 is mounted on another unit 61. Further, the changer sub unit 42 is mounted on a unit 41.

The changer sub unit 42 includes first to Nth slots 43-1 to 43-N (slot 1 to slot N) so that N CDs can be accommodated therein.

The unit 51 which includes the medium driving sub unit 52 and the unit 61 which includes the medium driving sub unit 62 have unique information (Node_Unique_ID) individually applied thereto.

Where the medium driving sub unit and the medium exchanging sub unit are mounted in units different from each other in this manner, it is described in the descriptor of each unit that the unit is associated with an external unit. In this instance, this is described using information unique to the unit in place of an ordinary address of a command. For information unique to the unit, where an IEEE 1394 bus is used, a number unique all over the world which is applied upon production of the unit called Node_Unique_Id is used.

FIG. 9 illustrates contents of an entry of a descriptor of each unit. In the first 1 byte, a port number (in the example shown, 2) of the changer sub unit is described. In the next 1 byte, linkage information of the first port (port 1) is described. In particular, data indicating that the unit 51 (which may suitably be referred to as external unit 1 in the following description) (composed of the CD sub unit 52) is connected to the first port is described. In the succeeding 8 bytes, the Node_Unique_Id of the unit 51 (external unit 1) is described.

In the following 1 byte, linkage information of the second port (port 2) is described. In particular, data indicating that the external unit 61 (which may be suitably referred to as external unit 2 in the following description) (composed of the CD sub unit 62) is connected to the second port is described. In the following 8 bytes, the Node_Unique_Id of the unit 61 (external unit 2) is described.

For example, when a packet in which a command which instructs the changer sub unit 42, which composes the unit 41 of the CD changer system, to load a CD accommodated in the slot 43-2 into the CD sub unit 52 is transmitted from the external apparatus to the changer sub unit 42, a code indicative of "loading of a medium" is described as a type of the command is described in the OPC of the command, and in the following OPR1, a slot number (in the example shown, 2) corresponding to the slot 43-2 is described as a slot number of the changer sub unit 42. In the next OPR2, a port number (in the example shown, 1) corresponding to the first port (port 1) to which the CD sub unit 52 is connected is placed as a port number for loading of a CD.

The number of the port to which the CD sub unit 52 is connected can be acquired by referring to the linkage information of the first port (port 1) described in the entry of the descriptor of the unit illustrated in FIG. 9, the Node_Unique_Id unique to the corresponding external unit, and the linkage information of the second port (port 2) and the Node_Unique_Id unique to the corresponding external unit.

Accordingly, in the present example shown, the changer sub unit 42 which composes the unit 41 loads a CD accommodated in the slot 43-2 (slot 2) into the CD sub unit 52 which composes the unit 51 connected to the first port (port 1) designated by the command from the external apparatus.

Further, for example, when a packet in which a command which instructs the changer sub unit 42, which composes the unit 41 of the CD changer system, to unload a CD accommodated in the CD sub unit 52 which composes the unit 51 into the slot 43-2 (slot 2) is transmitted from the external apparatus to the changer sub unit 42, a code indicative of "unloading of a medium" is described as a type of the command in the OPC of the command, and in the next OPR1, a slot number (in the example shown, 2) corresponding to the slot 43-2 is described as a slot number of the changer sub unit 42. In the next OPR2, a port number (in this instance, 1) corresponding to the first port (port 1) to which the CD sub unit 52 of the unit 51 is connected is placed as a port number for unloading of a CD.

The number of the port to which the CD sub unit 52 of the unit 51 is connected can be acquired by referring to the linkage information of the first port (port 1) described in the entry of the descriptor of the unit illustrated in FIG. 9 and the Node_Unique_Id of the corresponding external unit, and the linkage information of the second port (port 2) and the Node_Unique_Id of the corresponding external unit.

Accordingly, in the present example, the changer sub unit 42 which composes the unit 41 unloads a CD from the CD sub unit 52 which composes the unit 51 connected to the first port (port 1) designated by the command from the external apparatus into the slot 43-2 (slot 2).

While the particular description is omitted here, loading and unloading of a medium (CD) between any of the other slot 43-1 and slots 43-3 to 43-N and the unit 51 composed of the CD sub unit 52 or the unit 61 composed of the CD sub unit 62 can be performed basically similarly as described hereinabove.

A CD accommodated in an arbitrary slot can be loaded into an arbitrary CD sub unit so as to be played back or a CD set in an arbitrary CD sub unit can be unloaded into an arbitrary slot in such a manner as described above.

As described above, only one functional block (sub unit), that is, a medium exchanging sub unit, is provided, and it is not divided into detailed elements. Then, the medium exchanging sub unit defines a port for loading or unloading a medium therethrough and is linked with another medium driving sub unit which actually handles a medium to input and/or output data.

Consequently, a system wherein a medium driving sub unit is fixedly positioned to a port of a medium exchanging sub unit can be defined simply, and a movement of a medium can be requested with a single short command. In this instance, positioning of the medium driving unit and the port of the medium exchanging sub unit is described in descriptors (FIGS. 7 and 9) of the apparatus (units) having those two sub units and can be read out suitably when necessary.

Accordingly, in a simple system wherein a medium driving sub unit (for example, a CD sub unit) is fixedly positioned to a port of a medium exchanging sub unit (for example, a changer sub unit), address allocation of the individual functional blocks, command description and control can be performed simply.

It is to be noted that, in the present specification, the word "system" signifies an overall apparatus which is composed of a plurality of apparatus, means and so forth.

Further, in the present specification, the transmission medium may include an information recording medium such as a memory, a floppy disk (FD) or a CD-ROM (compact disc-read only memory) as well as a network transmission medium such as the internet or a digital satellite.

Furthermore, while the foregoing description is given of the case wherein the medium is a CD, the present invention can be applied also where a DVD (digital versatile disc), a CD-ROM (compact disc-read only memory) or some other medium is used.

While preferred embodiments of the present invention have been described using specific terms, such description is for illustrative purposes only, and it is to be understood that changes and variations may be made without departing from the spirit or scope of the following claims.

What is claimed is:

1. A communication controlling method for controlling exchanging of a medium between a plurality of apparatus connected to each other by a bus by which a control signal can be transmitted with a packet, said method comprising the steps of:

receiving, when exchanging of a plurality of media is to be controlled, over said bus an asynchronous packet according to a standard of said bus, in which said packet includes a command for performing control of a first sub unit which effects a medium changing operation and of a second sub unit which effects a medium driving operation, in which said changing operation and said driving operation are performed separately from each other; and transmitting a response to a one of said plurality of apparatus sending said asynchronous packet prior to performing said changing operation.

2. A communication controlling method for controlling exchanging of a medium between a plurality of apparatus connected to each other by a bus by which a control signal can be transmitted with a packet, said method comprising the steps of:

transmitting, when exchanging of a plurality of media is to be controlled, over said bus an asynchronous packet according to a standard of said bus, in which said packet includes a command for performing control of a first sub unit which effects a medium changing operation and of a second sub unit which effects a medium driving operation, in which said changing operation and said driving operation are performed separately from each other; and receiving a response from a one of said plurality of apparatus to which said packet is transmitted prior to performing said changing operation.

3. A communication controlling apparatus for controlling exchanging of a medium between a plurality of apparatus connected to each other by a bus by which a control signal can be transmitted with a packet, said apparatus comprising:

reception means for receiving an asynchronous packet according to a standard of said bus in which said packet includes a command for performing control of a first sub unit which effects a medium changing operation and of a second sub unit which effects a medium driving operation, in which said changing operation and said driving operation are performed separately from each other;

supply means for selectively supplying said command included in said packet received by said reception means to one of said first sub unit and said second sub unit; and transmitting means for transmitting a response to a one of said plurality of apparatus sending said asynchronous packet received at said reception means prior to performing said changing operation.

4. A communication controlling apparatus for controlling exchanging of a medium between a plurality of apparatus connected to each other by a bus by which a control signal can be transmitted with a packet, said apparatus comprising:

production means for producing an asynchronous packet according to a standard of said bus, in which said packet includes a command for performing control of a first sub unit which effects a medium changing operation and of a second sub unit which effects a medium driving operation, in which said changing operation and said driving operation are performed separately from each other;

transmission means for transmitting said packet produced by said production means to a different apparatus from said apparatus over said bus; and receiving means for receiving a response from a one of said plurality of apparatus producing said asynchronous packet before performing said changing operation.

5. A communication controlling system for controlling exchanging of a medium between a plurality of apparatus connected to each other by a bus by which a control signal can be transmitted with a packet, said system comprising;

production means provided in a first apparatus of said plurality of apparatus for producing an asynchronous packet according to a standard of said bus, in which said asynchronous packet includes a command for performing control of a first sub unit which effects a medium changing operation and of a second sub unit which effects a medium driving operation, in which said changing operation and said driving operation are performed separately from each other;

transmission means provided in said first apparatus for transmitting packet produced by said production means to a second apparatus of said plurality of apparatus over said bus;

reception means provided in said second apparatus for receiving said packet transmitted by said transmission means;

supply means provided in said second apparatus for selectively supplying said command included in said packet received by said reception means to one of said first sub unit and said second sub unit;

transmitting means located in said second apparatus for transmitting a response to said first apparatus prior to performing said changing operation; and receiving means located in said first apparatus for receiving said response.

6. A communication controlling system according to claim 5, wherein each of said plurality of apparatus respectively includes at least one of a first sub unit and a second sub unit, and further comprising storage means for storing linkage information representative of a linkage of said first sub unit and said second sub unit.

7. A communication controlling system according to claim 6, wherein, where said first apparatus includes said first sub unit and said second apparatus includes said second sub unit, said linkage information is based on identification information unique to said first and second apparatus.

8. A communication controlling system according to claim 6, wherein said bus is an IEEE 1394 bus.

9. A transmission method by which a computer program for controlling a communication controlling system for controlling exchanging of a medium between a plurality of apparatus connected to each other by a bus by which a control signal can be transmitted along with a packet is transmitted, said method comprising:

a production step of producing an asynchronous packet according to a standard of said bus; in which said packet includes a command for performing control of a first sub unit which effects a medium changing operation and of a second sub unit which effects a medium driving operation, in which said changing operation and said driving operation are performed separately from each other;

a transmission step of transmitting said asynchronous packet produced in said production step to another one of said plurality of apparatus over said bus;

a reception step of receiving said packet transmitted in said transmission step;

a supply step of selectively supplying said command included in said packet received in said reception step to one of said first sub unit and said second sub unit; and a transmitting step of transmitting a response from said another one of said plurality of apparatus producing said asynchronous packet prior to performing said driving operation.

* * * * *